United States Patent
Wolf

(10) Patent No.: US 8,172,532 B2
(45) Date of Patent: May 8, 2012

(54) DEVICE FOR ADJUSTMENT OF A ROTOR BLADE, WIND ENERGY CONVERTER, AND METHOD FOR ADJUSTING A ROTOR BLADE

(75) Inventor: Anton Wolf, Viktring (AT)

(73) Assignee: AMSC Austria GmbH, Klagnefurt Am Wörthersee (AT)

( * ) Notice: Subject to any disclaimer, the term of this patent is extended or adjusted under 35 U.S.C. 154(b) by 0 days.

(21) Appl. No.: 12/680,999

(22) PCT Filed: Nov. 11, 2009

(86) PCT No.: PCT/EP2009/064999
§ 371 (c)(1),
(2), (4) Date: Mar. 31, 2010

(87) PCT Pub. No.: WO2011/057664
PCT Pub. Date: May 19, 2011

(65) Prior Publication Data
US 2011/0243729 A1    Oct. 6, 2011

(51) Int. Cl.
*F03D 7/04* (2006.01)
(52) U.S. Cl. ......... 416/61; 416/155; 416/170 R; 416/1
(58) Field of Classification Search .......... 416/153, 416/155, 166, 170 R, 205, 61, 1; 290/44, 290/55
See application file for complete search history.

(56) References Cited

U.S. PATENT DOCUMENTS

| 4,311,435 | A | 1/1982 | Bergero |
| 6,428,274 | B1 | 8/2002 | Hehenberger |
| 6,783,326 | B2 * | 8/2004 | Weitkamp et al. ............. 416/1 |
| 6,939,103 | B2 | 9/2005 | Wobben |
| 7,513,742 | B2 * | 4/2009 | Rogall et al. ................ 416/47 |
| 7,717,673 | B2 * | 5/2010 | Menke ......................... 416/1 |

FOREIGN PATENT DOCUMENTS

| DE | 10116011 | 5/2002 |
| EP | 0754881 | 1/1997 |
| EP | 1647708 | 4/2006 |
| GB | 661942 | 6/1949 |
| JP | 61-055369 | 3/1986 |
| WO | 03/091570 | 11/2003 |

* cited by examiner

*Primary Examiner* — Ninh H Nguyen
(74) *Attorney, Agent, or Firm* — Occhiuti Rohlicek & Tsao LLP

(57) ABSTRACT

A method for adjusting a pivotally mounted rotor blade of a wind energy converter includes controlling a first drive and a second drive to collectively turn the rotor blade into an operating position; detecting whether a failure of the first drive has occurred; activating, when the failure of the first drive has occurred, a first activatable lockout connected to the rotor blade, which prevents turning of the rotor blade into the operating position while allowing turning of the rotor blade into a feathered position; and controlling, when the failure of the first drive has occurred, the second drive to turn the rotor blade into the feathered position.

19 Claims, 4 Drawing Sheets

DEVICE FOR ADJUSTMENT OF A ROTOR BLADE, WIND ENERGY CONVERTER, AND METHOD FOR ADJUSTING A ROTOR BLADE

BACKGROUND

The present invention relates to a device for adjustment of a rotor blade mounted on a rotor hub of a wind energy converter, to a corresponding method for adjusting a rotor blade of a wind energy converter, and to a wind energy converter.

Wind energy can be converted into useful forms, such as electricity, by a wind energy converter that generally includes a generator driven by a rotor, e.g. a low-speed propeller, rotatably supported at the upper end of a tower. The rotor typically includes a centrally positioned rotor hub and at least one rotor blade, which extends radially from the rotor hub.

Subject to the action of wind forces, wind energy converters are exposed to high stresses. One method of reducing the forces acting on the wind energy converter is to use rotor blade adjustment, wherein the rotor blades are rotatably attached to the rotor hub, such that each rotor blade can be turned around an axis of rotation approximately in the longitudinal direction of the blade, between an operation position, which enables the wind to drive the rotor, and a feathered position in which the rotor blade presents the least resistance to the wind. Rotor blade adjustment can also be used for braking the rotor by turning the rotor blades into the feathered position when the wind energy converter is to be shut down.

In wind energy converters according to the prior art, which for the most part have three rotor blades, the latter are usually adjusted by a central linear drive in combination with a mechanical rod. Newer systems use mechanical/electrical and mechanical/hydraulic individual blade adjustment drives, typically located in the rotor hub. In order to be able to quickly turn each rotor blade into a desired operating position during operation and into the feathered position for shutdown, the drive or drives must be dimensioned to provide a corresponding power output predetermined by the rotor blades and the loads thereof.

Basically the rotor blades are subjected to loads due to inertial forces, forces of gravity (the center of gravity of the rotor blades generally lies outside their axis of rotation) and the external wind forces. The wind forces act towards turning the rotor blades in the direction of the feathered position, while the inertial forces act in both directions according to the respective position of the rotor blades during one rotor revolution, the inertial forces mostly predominating. Turning of the rotor blades beyond the feathered position is conventionally limited by a mechanical stop. If the rotor blades are not stopped, such as in the event of failure of a blade adjustment drive, they execute an oscillating rotary motion around their axis of rotation over the course of one rotor revolution, preventing a shutdown of the wind energy converter. Even in a wind energy converter with individual blade adjustment drives for each rotor blade, where it may be possible to brake the rotor by turning only a subset of the rotor blades into the feathered position, failure to turn one of the blades will subject the wind energy converter to excessive and potentially damaging loads.

U.S. Pat. No. 6,939,103 discloses a wind power installation in which an adjusting device for adjusting the pitch angle of a rotor blade has at least two electric-motor drives for applying force for adjustment of the rotor blade. Each individual adjusting drive is over-sized so that, in a situation where one of the drives fails, a remaining drive can still be operated to bring the rotor blade into the feathered position. However, since the drives have to be dimensioned to provide more power output than is required in normal operation, the cost of the wind energy converter is considerably increased.

Likewise in a case of adjusting the rotor blades against spring force or hydraulic pressure that act into the direction of the feathered position, rotor blade adjustment drives must be expensively dimensioned for higher loads since the spring force or the force of hydraulics must also be overcome.

U.S. Pat. No. 6,428,274 discloses a device for adjustment of rotor blades of a wind power plant with a drive for turning the rotor blades and an activatable lockout connected to each rotor blade. In an activated state the lockout prevents turning of the rotor blades into the operating position but allows turning the rotor blades into the feathered position. In the event of the drive becoming inoperative due to a power failure, the lockout is activated to allow turning when the rotor, during its rotation, passes a region where external wind, gravitational and inertial forces combine to turn the blade in the direction of the feathered position, and to prevent turning when the rotor passes a region where external forces combine in the opposite direction. While the rotor blade may eventually reach the feathered position in this way, a considerable number of revolutions of the rotor may be required during which the wind energy converter is subjected to excessive and potentially damaging stresses because the blade has not yet reached the feathered position.

SUMMARY

One general aspect of the invention relates to a device for adjustment of a pivotally mounted rotor blade of a wind energy converter. The device comprises a first drive and a second drive that cooperate to turn the rotor blade between an operating position and a feathered position. Among other advantages, the first and second drives are each configured to apply corresponding first and second torques to the rotor blade for turning the rotor blade by the joint action of the torques. The device further comprises a first activatable lockout connected to the rotor blade, which in an activated state prevents turning of the rotor blade into the operating position, but allows turning of the rotor blade into the feathered position.

Because two drives are provided that each are capable of applying a torque to the rotor blade, in the event of the first drive becoming inoperative e.g. due to a technical failure of the drive itself or of control or power supply systems connected to the drive, the second drive remains capable of applying the second torque to the rotor blade in the direction towards the feathered position of the rotor blade. Depending on the rotational position of the rotor, the second torque will combine with external forces such as wind, gravitational and inertial forces resulting in a combined torque sufficient to turn the rotor blade towards the feathered position.

When the rotor blade, during its rotation, passes an angular region where external forces and the second torque do not combine into a combined torque sufficient to turn the rotor blade towards the feathered position, the activatable lockout prevents it from being turned in the direction away from the feathered position until the rotor again reaches an angular region in which the second torque combines with external forces into a sufficient combined torque to continue turning the rotor blade towards the feathered position.

Due to the combination of the external forces with the second torque, as supplied by the second drive, angular regions in which the combined torque is sufficient for turning the rotor blade in the direction of the feathered position are significantly enlarged as a proportion of a full circle rotation of the rotor, compared to those angular regions where the external forces alone would suffice to turn the rotor blade in the direction of the feathered position. Therefore, during rotation of the rotor, the rotor blade spends a particularly high proportion of time in such angular regions where it is turned towards the feathered position. Consequently, the rotor blade quickly reaches the feathered position, such that stresses on the wind energy converter are avoided.

The activatable lockout prevents the rotor blade from being turned away from the feathered position, and therefore from performing an oscillatory rotational motion, without the second drive having to be dimensioned to be generally capable of turning the rotor blade independent of the angular position of the rotor and the action of external forces. Thus, costly overdimensioning of the second drive is unnecessary.

Embodiments of this aspect may include one or more of the following features.

The device further comprises a detector for detecting a failure of the first drive, and a controller, which controls the second drive to turn the rotor blade into the feathered position, when the detector has detected the failure of the first drive. In this way, the failure of the first drive can be detected quickly, and damage due to stresses can be avoided by performing a fast shutdown of the wind energy converter.

Optionally, the controller is configured to activate the first activatable lockout when the detector has detected the failure of the first drive. In this way, rotation of the rotor blade away from the feathered position is blocked such that a particularly fast shutdown can be performed.

At least one of the first and second drives may comprise an electric motor, the device further comprising a first lockout activator that activates the first activatable lockout in case of loss of electric power. This enables a shutdown to be performed even in an event where both drives fail simultaneously due to the power loss.

In some embodiments, the first activatable lockout comprises a backstop, which prevents turning of the rotor blade into the operating position. The backstop is particularly robust and inexpensive to implement.

The first activatable lockout may be assigned to a drive axis of the first drive, i.e. be configured to prevent the turning of the rotor blade by locking the drive axis of the first drive. This enables a particularly smooth switchover from the failed first drive to the lockout since the locking torque is applied to the rotor blade through the same axis as was the torque of the first drive before its failure.

In some embodiments, the device further comprises a second activatable lockout, which in an activated state thereof prevents turning of the rotor blade into the operating position but allows turning of the rotor blade into a feathered position. The second activatable lockout is assigned to a drive axis of the second drive, i.e. configured to prevent the turning of the rotor blade by locking the drive axis of the second drive. This enables a particularly smooth switchover in case of a failure of the second drive to the second lockout since the locking torque is applied to the rotor blade through the same axis as was the torque of the second drive before its failure.

The first and second drives may be configured to act on the rotor blade at different points of action. This increases the smoothness of operation since stresses in the rotor blade, its bearing, and the rotor hub are minimized.

In some embodiments, the first and second drives include respective first and second pinions, which mesh with a circular gear coupled to the rotor blade. The first and second pinions may be positioned, with respect to a central axis of the circular gear, at a mutual angular distance of less than 90°. Since typically the operating position and the feathered position of the rotor blade are separated by an approximately equal amount, the pinions mesh with only a part of the teeth of the circular gear, such that teeth do not have to be provided full-circle around the circular gear. Optionally, the circular gear comprises an angular zone of surface-hardened gear teeth, which angular zone encompasses less than 180° of the circular gear. This is particularly economical because fewer surface-hardening procedures have to be performed, while a circular gear typically is easier to manufacture with full-circle toothing.

In some embodiments, a plurality of drives is provided to collectively supply a required torque for turning the rotor blade, at any angular position of the rotor hub, during operation of the wind energy converter. Herein, the drives that remain after a failure of one of the plurality of drives collectively supply less than the required torque, enabling low provision cost.

Optionally, each individual drive of the plurality of drives is configured to supply an equal individual torque. In this way, the maximum possible loss of contributed torque that may occur when one of the drives fails is minimized.

Another general aspect of the invention provides a wind energy converter comprising a rotor blade pivotally mounted on the rotor hub and the device for adjustment of the rotor blade as described above. In embodiments of this aspect, the rotor blade may be mounted on the rotor hub for rotation around a pivotal axis, the rotor blade comprising a center of gravity positioned off the pivotal axis. This positioning of the center of gravity enables gravitational forces on the rotor blade to be used for turning the rotor blade into the feathered position in case one or more of the drives fail.

Another general aspect of the invention provides a method for adjusting a pivotally mounted rotor blade of a wind energy converter. The method comprises a step of controlling a first drive and a second drive to collectively turn the rotor blade into an operating position. A further step includes detecting whether the first drive has failed. When the first drive fails, a first activatable lockout connected to the rotor blade is activated. The first activatable lockout is configured to prevent turning of the rotor blade into the operating position while allowing turning of the rotor blade into a feathered position. Furthermore, when the first drive fails, the second drive is controlled to turn the rotor blade into the feathered position.

Embodiments of this aspect may include one or more of the following features.

The method further comprises decoupling the first drive from the rotor blade upon failure of the first drive. This enables the rotor blade to turn into the feathered position even if the first drive has been mechanically blocked due to the failure.

The method may further comprise steps of detecting failure of the second drive has occurred, and of activating the first activatable lockout upon occurrence of such a failure. This also serves to protect the rotor blade from rotating away from the feathered position in case the second drive fails.

In some embodiments, wherein the first activatable backstop is assigned to a drive axis of the first drive, the method further comprises a step of activating, when the failure of the second drive has occurred, a second activatable backstop assigned to a drive axis of the second drive, which likewise in the activated state prevents turning of the rotor blade into the operating position but allows turning of the rotor blade into a feathered position. This enables a particularly smooth switchover in case of a failure of one of the drives to the associated lockout since the locking torque is applied to the rotor blade through the same axis as was the torque of the failed drive.

The method may further comprise a step of controlling the first drive to turn the rotor blade into the feathered position when the second drive has failed. This enables a quick shutdown the wind energy converter when either drive fails.

In some embodiments, the method comprises controlling the first and second drives to exert mutually counteracting torques on the rotor blade. This avoids backlash and associated wear between the drives and the rotor blade.

Other features and advantages are illustrated in the accompanying drawings and described in detail in the following part of the description.

FIGURES

In the Figures.

Throughout the figures, the same reference numbers indicate the same or functionally equivalent means.

DETAILED DESCRIPTION

Figure 1:
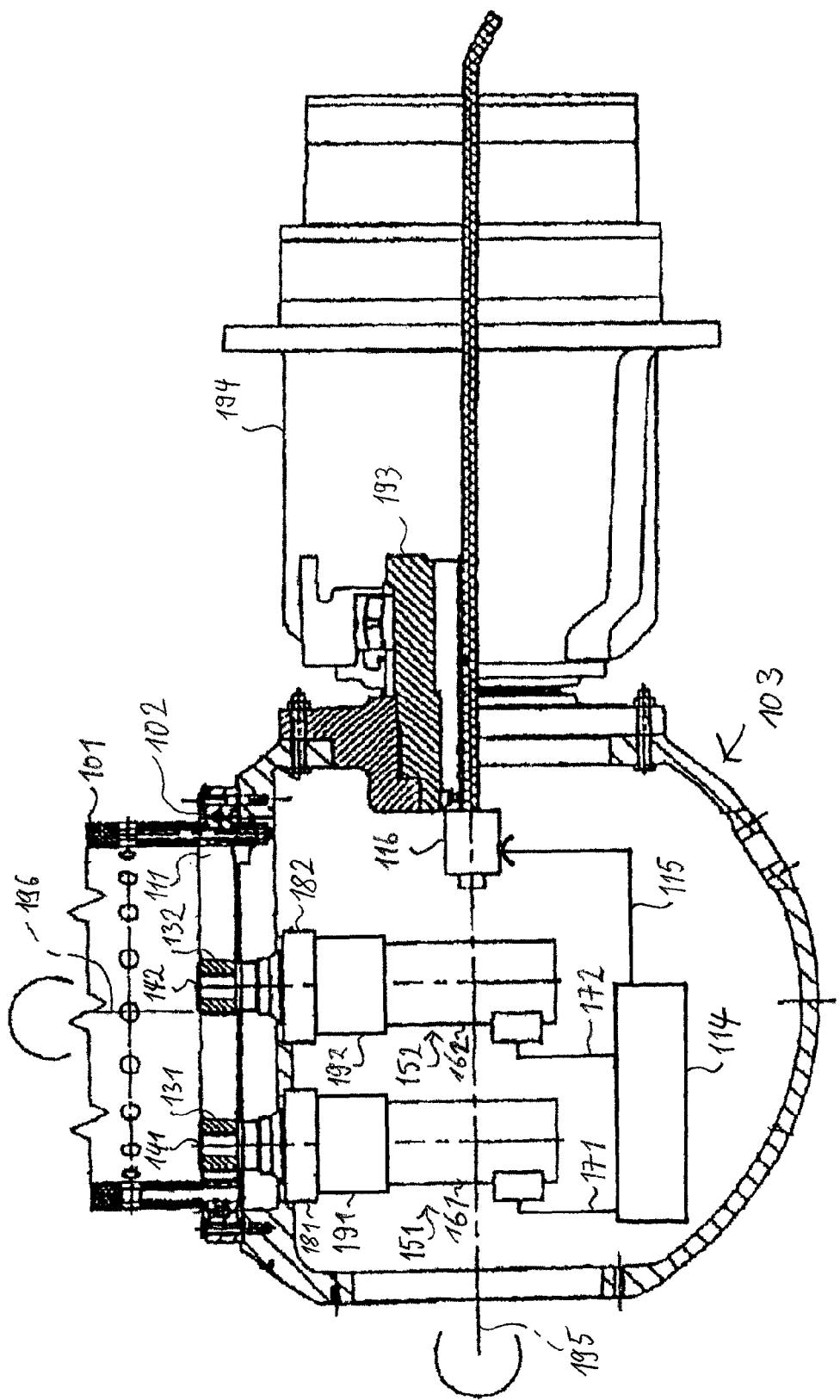
FIG. 1 is a cross section of a hub of a wind energy converter comprising a device for rotor blade adjustment.

FIG. 1 shows a cross-sectional view of a rotor hub 103, held rotatably around a rotor axis 195 in a rotor bearing 193 of a wind energy converter. In the particular hub shown, the rotor bearing 193 is mounted on a nacelle 194 (shown in part) that is itself rotatably held on top of a tower. One rotor blade 101 is attached to an inner ring of a pivot bearing 102, the outer ring of the pivot bearing 102 being screwed to the rotor hub 103. For reasons of clarity, only one rotor blade 101 is drawn. Conventionally, however, a wind energy converter includes more than one rotor blade 101, and generally three rotor blades.

The rotor blade 101 is attached to a pivot bearing 102 with internal toothing 111 forming a circular gear. The pivot bearing 102 holds the rotor blade 101 rotatably around a blade rotation axis 196, which is slightly slanted with respect to the longitudinal direction (not shown) of the rotor blade 101, such that the center of gravity of the rotor blade lies outside the blade rotation axis 196. A first 151 and a second 152 geared electric-motor drive with corresponding first 131 and second 132 pinions, which when rotating around respective drive axes 141, 142 turn the rotor blade 101, are assigned to each rotor blade.

Figure 2:
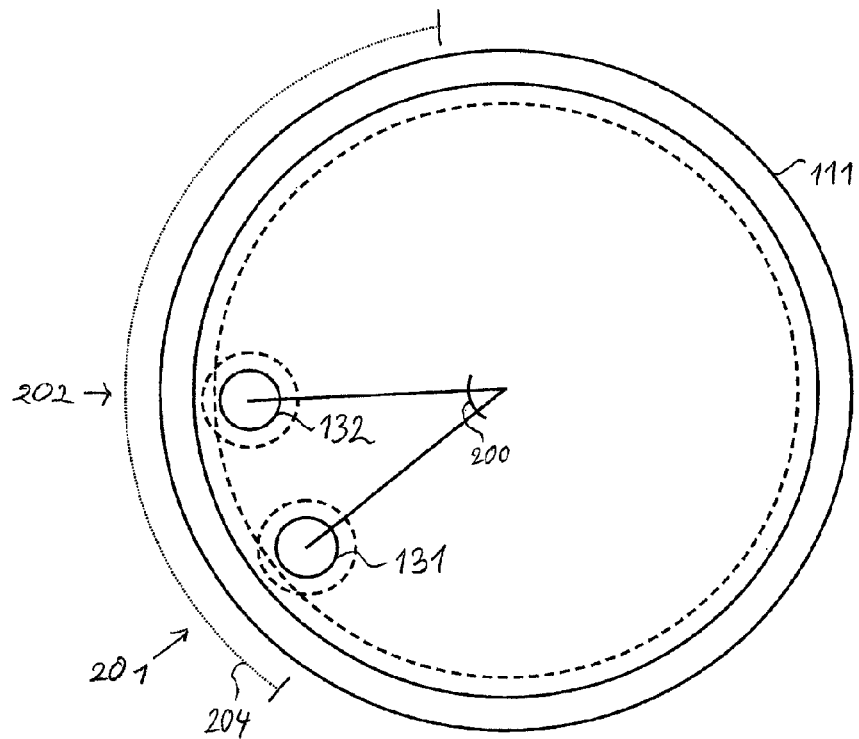
FIG. 2 is a diagram of a circular gear and pinions of the device of FIG. 1.

The first 131 and second 132 pinions, as is shown in FIG. 2, mesh with the internal toothing 111 of the pivot bearing 102 at respective angular positions 201, 202 that are spaced apart by an angular spacing 200 of less than 45°. In operation of the wind energy converter, the pinions 131, 132 contact the internal toothing 111 only within an angular zone 204 that encompasses less than a half-circle, the size of the angular zone 204 being the sum of the angular spacing 200 and the angular distance between a feathered position and an operating position of the rotor blade. The inner toothing 111 has surface-hardened teeth only within the angular zone 204.

The power is supplied in normal operation for all drive units 151, 152 via a slip ring 116 and a line 115. A drive control unit 114, which receives power from the slip ring line 115 and is connected via drive lines 171, 172 to the drives 151, 152, ensures synchronism of the rotor blades 101 with each other. Each of the drives 151, 152 includes an electric motor 161, 162, a gearing 181, 182 and a lockout 191, 192. When one of the drives 151, 152 fails, the respective lockout 191, 192 causes the rotor blade 101 to be able to turn only in the direction of the feathered position.

Figure 3:
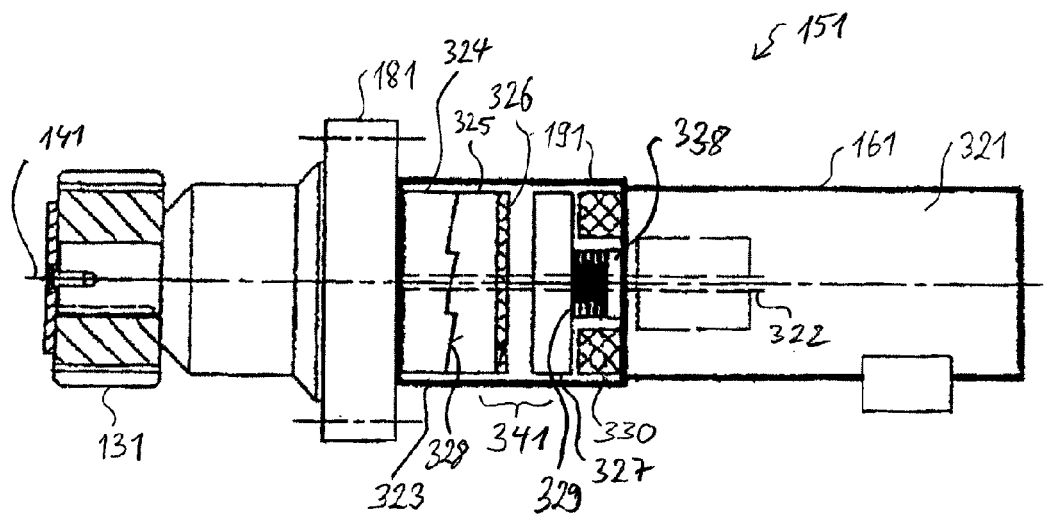
FIG. 3 is a cross-section of a rotor blade adjustment drive of the device of FIG. 1.

FIG. 3 shows one example in which the lockout 191 from FIG. 1, is a backstop. The drive 151 shown has a gearing 181, a stator 321 and a rotor with an elongated rotor shaft 322. The lockout 191 has a housing 323 which is permanently connected to the stator 321 and a bottom part 324 of a free wheel, the part 324 being permanently connected to the housing 323. The top part 341 of the free wheel has a coupling part 325 with a brake lining 326 on the side facing away from the bottom part 324. The coupling part 325 is freely turning and is supported to be able to move axially on the rotor shaft 322. The coupling part 325 and the bottom part 324 on the sides facing one another have a sawtooth-like profile 328, which allows mutual rotation in only one direction. The top part 341 furthermore has a brake disk 327 connected with axial displacement capacity but torsionally strong to the rotor shaft 322, i.e. in a way that allows axial displacement of the brake disk 327 along the rotor shaft 322 but prevents rotation of the brake disk 327 and the rotor shaft 322 relative to each other. The rotor shaft 322 has an attached concentric plate 338. One spring 329 is pre-tensioned under pressure between the plate 338 and the brake disk 327.

For rotor blade adjustment in normal operation, the brake disk 327 is raised from the brake lining 326 by an electromagnet 330 against the force of the spring 329. As a result, the drive 151 can turn freely in both directions. It is also fundamentally conceivable for the brake disk 327 and the brake lining 326 to be omitted and the spring 329 to press on the coupling part 325 and for the coupling part 325 to be attracted directly by the electromagnet 330. The coupling part 325 must then be connected torsionally strong to the shaft 322, i.e. in a way that prevents rotation of the coupling part 325 and the shaft 322 relative to each other.

When the drive 151 fails, the electromagnet 330 is automatically deactivated. As a result, the force of the spring 329 presses the brake disk 327 against the brake lining 326 so that rotation of the coupling part 325 of the free wheel relative to the rotor shaft 322 is prevented. By means of the sawtooth-like profile 328 of the coupling part 325 and of the bottom part 324 of the free wheel and by the displacement capacity of the coupling part 325, which is axial against the force of the spring 329, the rotor shaft 322 of the motor 161, and as a result the rotor blade 101, can only continue to turn in the direction of the feathered position as far as a mechanical stop (not shown) allows.

Figure 4:
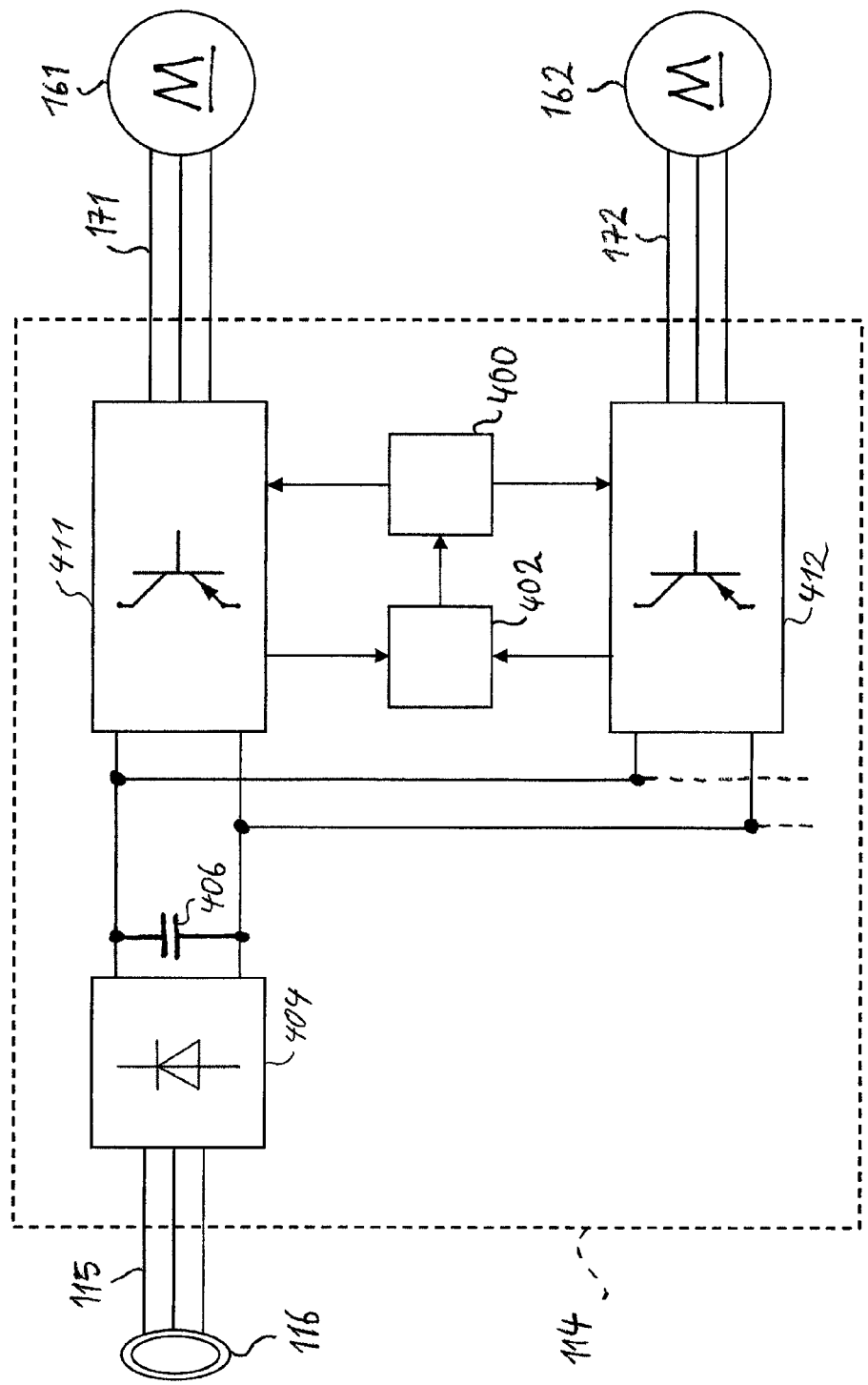
FIG. 4 is a circuit diagram of a controller of a device for rotor blade adjustment.

FIG. 4 shows a schematic circuit diagram of the controller unit 114 for controlling the electric motors 161, 162 of the first 151 and second drives 152. The controller unit 114 includes a rectifier 404 that receives three-phase voltage from the slip ring 116, and supplies direct voltage to a capacitor 406. The direct voltage is supplied to a first 411 and a second 412 converter, which respectively output three-phase current for driving the motors 161, 162 of the first 151 and second drives 152. Further converters may be connected to the direct voltage of the rectifier 404 for supplying further drives. Furthermore, a battery may be connected in parallel with capacitor 406 in order to enable operation during a power outage.

The controller unit 114 further includes a detector 402 for detecting a failure of one of the drives 151, 152, e.g. a failure of the corresponding electric motor 161, 162 or the attached corresponding converter 411, 412. The detector 402 is connected to a shutdown controller 400 of the controller unit 114, which in the event of a failure of the first drive 151 controls the second drive 152 to turn the rotor blade into the feathered position, and in the event of a failure of the second drive 152 controls the first drive 151 to turn the rotor blade into the feathered position.

Figure 5:
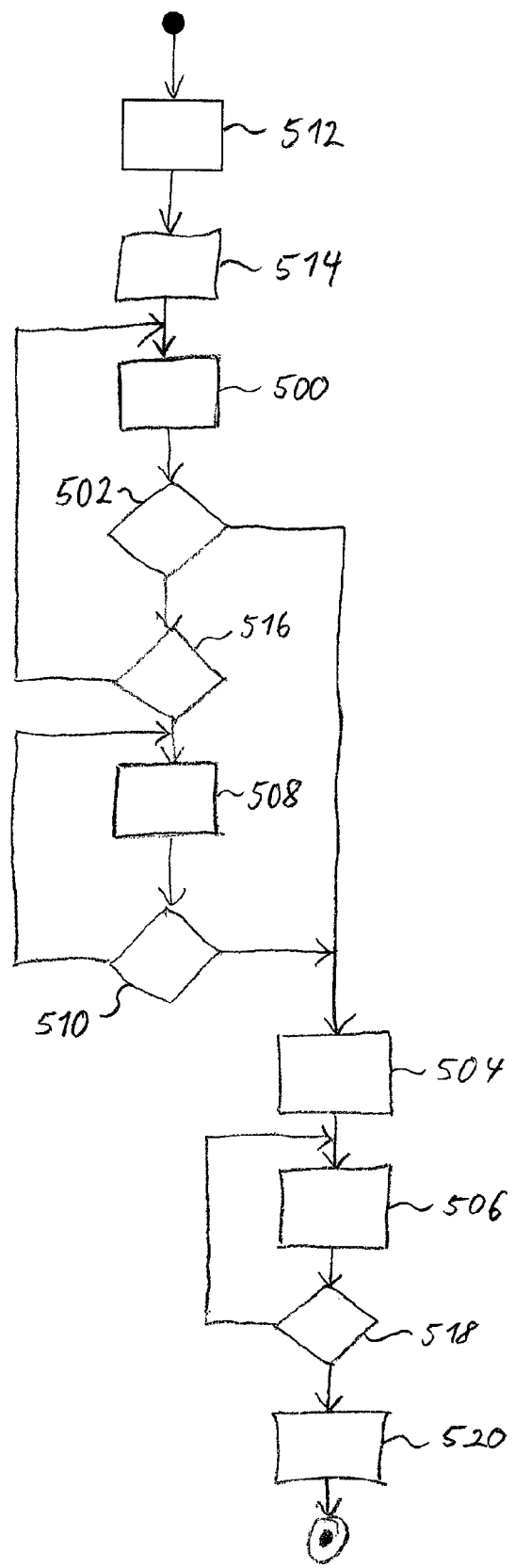
FIG. 5 is a flow diagram of a method for adjusting a rotor blade.

FIG. 5 shows a flow diagram of a method for adjusting a rotor blade, which is pivotally mounted on a rotor hub of a wind energy converter. In initial step 512, a desired operating position of the rotor blade is determined, e.g. based on the present wind conditions. In step 514, the present position of the rotor blade is determined.

In step 500, a first drive and a second drive, which both are configured to apply torque to the rotor blade, are controlled to collectively turn the rotor blade from the present position determined in step 514 into the operating position determined in step 512.

In decision step 502, it is determined whether a failure of the first drive has occurred. If no failure has occurred, in step 516, it is examined whether the operating position determined in step 512 has been reached. If this is not the case, the method returns to step 500. Once the operating position has been reached, in step 508, the first and second drives are controlled to exert mutually counteracting torques on the rotor blade in order to stabilize it without backlash on the operating position.

In decision step 510, it is again determined whether a failure of the first drive has occurred. If no failure has occurred, the method returns to step 508. If either in step 502 or in step 510 a failure of the first drive is detected, in step 504 a first activatable lockout connected to the rotor blade is activated to prevent the rotor blade from turning into the operating position while allowing the rotor blade to turn into the feathered position. In step 506, the second drive is controlled to turn the rotor blade into the feathered position.

In step 508, it is determined whether the feathered position has been reached. Once it has been reached, the rotor blade is locked in step 520.

The invention claimed is:

1. A device for adjustment of a pivotally mounted rotor blade of a wind energy converter, the device comprising: a first drive and a second drive that cooperate to turn the rotor blade between an operating position and a feathered position; a first activatable lockout connected to the rotor blade, which in an activated state prevents turning of the rotor blade into the operating position, but allows turning of the rotor blade into the feathered position; a detector for detecting a failure of the first drive; and a controller that controls the second drive to turn the rotor blade into the feathered position when the detector has detected the failure of the first drive.

2. The device of claim 1, wherein the controller is configured to activate the first activatable lockout when the detector has detected the failure of the first drive.

3. The device of claim 1, wherein at least one of the first and second drives comprises an electric motor, the device further comprising a first lockout activator, which activates the first activatable lockout in case of loss of electric power.

4. The device of claim 1, wherein the first activatable lockout comprises a backstop, which prevents turning of the rotor blade into the operating position.

5. The device of claim 4, further comprising a second activatable lockout, which in an activated state prevents turning of the rotor blade into the operating position but allows turning of the rotor blade into a feathered position, the second activatable lockout being configured to prevent the turning of the rotor blade by locking a drive axis of the second drive.

6. The device of claim 1, wherein the first activatable lockout is configured to prevent the turning of the rotor blade by locking a drive axis of the first drive.

7. The device of claim 1, wherein the first and second drives are configured to act on the rotor blade at different points of action.

8. The device of claim 1, wherein the first and second drives include respective first and second pinions meshing with a circular gear coupled to the rotor blade.

9. The device of claim 8, wherein the first and second pinions are positioned, with respect to a central axis of the circular gear, at a mutual angular distance of less than 90°.

10. The device of claim 8, wherein the circular gear comprises an angular zone of surface-hardened gear teeth, the angular zone encompassing less than 180° of the circular gear.

11. The device of claim 1, wherein a plurality of drives is provided to collectively supply a required torque for turning the rotor blade at any angular position of the rotor hub during operation of the wind energy converter, and wherein drives remaining after a failure of one of the plurality of drives collectively supply less than the required torque.

12. The device of claim 11, wherein each of the plurality of drives is configured to supply an equal individual torque.

13. A wind energy converter, comprising: a rotor hub; a rotor blade pivotally mounted on the rotor hub; a device for adjustment of the rotor blade, the device including a first drive and a second drive that cooperate to turn the rotor blade between an operating position and a feathered position; a first activatable lockout connected to the rotor blade, which in an activated state prevents turning of the rotor blade into the operating position, but allows turning of the rotor blade into the feathered position; a detector for detecting a failure of the first drive; and a controller that controls the second drive to turn the rotor blade into the feathered position when the detector has detected the failure of the first drive.

14. The wind energy converter of claim 13, wherein the rotor blade is mounted on the rotor hub for rotation around a pivotal axis, the rotor blade comprising a center of gravity positioned off the pivotal axis.

15. A method for adjusting a pivotally mounted rotor blade of a wind energy converter, the method comprising: controlling a first drive and a second drive to collectively turn the rotor blade into an operating position; detecting whether a failure of the first drive has occurred; activating, when the failure of the first drive has occurred, a first activatable lockout connected to the rotor blade, which prevents turning of the rotor blade into the operating position while allowing turning of the rotor blade into a feathered position; and controlling, when the failure of the first drive has occurred, the second drive to turn the rotor blade into the feathered position.

16. The method of claim 15, further comprising decoupling the first drive from the rotor blade when the failure of the first drive has occurred.

17. The method of claim 16, wherein the first activatable lockout is coupled to a drive axis of the first drive, the method further comprising activating, when the failure of the second drive has occurred, a second activatable lockout, which in the activated state prevents turning of the rotor blade into the operating position but allows turning of the rotor blade into a feathered position, the second activatable lockout being coupled to a drive axis of the second drive.

18. The method of claim 16, further comprising controlling the first drive to turn the rotor blade into the feathered position, when the failure of the second drive has occurred.

19. The method of claim 15, comprising controlling the first and second drives to exert mutually counteracting torques on the rotor blade.

* * * * *